United States Patent
Koskinen (10) Patent No.: US 11,849,323 B2
(45) Date of Patent: *Dec. 19, 2023

(54) PDCP COUNT HANDLING IN RRC CONNECTION RESUME

(71) Applicant: Nokia Technologies Oy, Espoo (FI)

(72) Inventor: Henri Koskinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,471

(22) Filed: Nov. 22, 2021

(65) Prior Publication Data

US 2022/0086643 A1  Mar. 17, 2022

Related U.S. Application Data

(63) Continuation of application No. 16/329,372, filed as application No. PCT/FI2017/050620 on Sep. 4, 2017, now Pat. No. 11,212,680.

(Continued)

(51) Int. Cl.
*H04W 4/00* (2018.01)
*H04W 12/106* (2021.01)
(Continued)

(52) U.S. Cl.
CPC ......... *H04W 12/106* (2021.01); *H04W 76/19* (2018.02); *H04W 76/27* (2018.02); *H04W 36/0038* (2013.01); *H04W 80/02* (2013.01)

(58) Field of Classification Search
None
See application file for complete search history.

(56) References Cited

U.S. PATENT DOCUMENTS

| 2008/0188220 A1 | 8/2008 | DiGirolamo et al. |
| 2009/0122762 A1 | 5/2009 | Kitazoe et al. |

(Continued)

FOREIGN PATENT DOCUMENTS

| CN | 102804901 A | 11/2012 |
| CN | 102823186 A | 12/2012 |

(Continued)

OTHER PUBLICATIONS

"3rd Generation Partnership Project; Technical Specification Group Radio Access Network; Evolved Universal Terrestrial Radio Access (E UTRA); Packet Data Convergence Protocol (PDCP) specification (Release 13)", 3GPP TS 36.323 V 13.2.1 (Jun. 2016), 39 pages.

(Continued)

*Primary Examiner* — Zewdu A Beyen
(74) *Attorney, Agent, or Firm* — ALSTON & BIRD LLP (57) ABSTRACT

Methods and apparatus, including computer program products, are provided for resuming connections. In some example embodiments, there may be provided a method that includes receiving, at a user equipment, a radio resource control connection resume message; verifying, at the user equipment, an integrity of the received radio resource control connection resume message, wherein the user equipment verifies the integrity based on a predetermined value of a packet data convergence protocol hyper frame number; and resuming, by the user equipment, use of a suspended radio resource control connection, when the integrity verification of the received radio resource connection resume message is passed successfully. Related systems, methods, and articles of manufacture are also described.

16 Claims, 5 Drawing Sheets

Related U.S. Application Data (60) Provisional application No. 62/394,057, filed on Sep. 13, 2016.

(51) Int. Cl.
    *H04W 76/27*     (2018.01)
    *H04W 76/19*     (2018.01)
    *H04W 80/02*     (2009.01)
    *H04W 36/00*     (2009.01)

(56) References Cited

U.S. PATENT DOCUMENTS

| | | |
|---|---|---|
| 2015/0063252 A1 | 3/2015 | Zhang et al. |
| 2015/0280905 A1* | 10/2015 | Shah .................. H04L 47/34 370/504 |
| 2016/0212661 A1 | 7/2016 | Basu Mallick et al. |
| 2017/0290072 A1 | 10/2017 | Chen et al. |
| 2018/0013685 A1 | 1/2018 | Yu et al. |

FOREIGN PATENT DOCUMENTS

| | | |
|---|---|---|
| CN | 103155463 A | 6/2013 |
| CN | 103200565 A | 7/2013 |
| CN | 103339979 A | 10/2013 |
| CN | 105594251 A | 5/2016 |
| CN | 105960816 A | 9/2016 |
| WO | WO 2004/073347 A1 | 8/2004 |
| WO | WO 2011/038252 A2 | 3/2011 |
| WO | WO 2016/086144 A1 | 6/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 13)", 3GPP TS 36.331 v 13.2.0 (Jun. 2016), 623 pages.

"3rd Generation Partnership Project; Technical Specification Group Radio Access Network; Evolved Universal Terrestrial Radio Access Network (E-UTRAN); X2 application protocol (X2AP) (Release 13)", 3GPP TS 36.423 V13.4.0 (Jun. 2016), 238 pages.

Ericsson, "RRC Resume Signaling Flow and RRC Actions", 3rd Generation Partnership Project (3GPP), 3GPP TSG-RAN WG2 #93, R2-161751, pp. 1-5, XP051065950, Malto, Feb. 15-19, 2016.

Ericsson, "RRC Security Handling", 3rd Generation Partnership Project (3GPP), 3GPP TSG-RAN WG2#57, R2-070801, 5 pages, XP050133826, St. Louis, USA, Feb. 12-16, 2007.

Final Office Action for U.S. Appl. No. 16/329,372 dated Jul. 29, 2020.

Huawei et al., "Revised Work Item: Narrowband IoT (NB-IoT)", 3GPP TSG RAN Meeting #70, RP-152284 (Dec. 2014), 11 pages.

International Search Report for PCT/FI2017/050620 dated Nov. 10, 2017.

Non-Final Office Action for U.S. Appl. No. 16/329,372 dated Feb. 6, 2020.

Non-Final Office Action for U.S. Appl. No. 16/329,372 dated Apr. 16, 2021.

Notice of Allowance for U.S. Appl. No. 16/329,372 dated Aug. 26, 2021.

Office Action for Chinese Application No. 2017800560876 dated Aug. 26, 2021, 12 pages.

Office Action for Chinese Patent Application No. 201780060473.2 dated Dec. 16, 2020, with English translation, 18 pages.

Office Action for European Application No. 17777614.3 dated Dec. 9, 2020, 5 pages.

Office Action for European Application No. 17777614.3 dated Jun. 10, 2021, 5 pages.

Office Action for European Application No. 17777614.3 dated Mar. 30, 2020, 6 pages.

ZTE Corporation, "Issue on Resume Procedure", 3GPP TSG-RAN2 Meeting #95, R2-165825 (Aug. 2016), 3 pages.

ZTE, "Issue on Resume Procedure", 3GPP TSG-RAN WG2 Meeting #95, R2-164862 (Aug. 2016), 7 pages.

Office Action for Chinese Application No. 201780056087.6 dated Apr. 24, 2022, 15 pages.

Office Action for Chinese Application No. 201780056087.6 dated Jan. 5, 2023, 11 pages.

\* cited by examiner

FIG. 4

PDCP COUNT HANDLING IN RRC CONNECTION RESUME

CROSS-REFERENCE TO RELATED APPLICATIONS

This application is a continuation of U.S. Non-Provisional patent application Ser. No. 16/329,372, filed Feb. 28, 2019 and entitled "PDCP COUNT HANDLING IN RRC CONNECTION RESUME," which was a National Phase filing of International Patent Application Serial No. PCT/FI2017/050620, filed Sep. 4, 2017, which claims priority to, and the benefit of, U.S. Provisional Application Ser. No. 62/394,057, filed Sep. 13, 2016, the entire disclosures of each of which are hereby incorporated herein by reference in their entireties for all purposes.

FIELD

The subject matter described herein relates to wireless technologies.

BACKGROUND

User equipment (UE), such as a smartphone, a cell phone, an Internet of Things (IoT) device, and/or other type of wireless apparatus accessing a radio access network including a base station, may suspend a connection, and then resume the connection at a later time. For example, a radio resource control (RRC) connection may be suspended between the UE and base station. When this is the case, some of the communications, such as user plane traffic between the user equipment and the base station, may be suspended. However, the UE and the base station may maintain the context of the connection, so that the UE and base station can quickly resume the RRC connection using the prior context, without having to create an entirely new RRC connection. The context may include the radio bearer configuration information, security parameters, cell identifiers, physical layer configuration information, measurement and reporting configuration information, and/or the like. Examples of connection suspension and resume of RRC connections can be found in TS 36.331. See, e.g., 3GPP TS 36.331 V13.2.0 (2016-06), 3rd Generation Partnership Project; Technical Specification Group Radio Access Network; Evolved Universal Terrestrial Radio Access (E-UTRA); Radio Resource Control (RRC); Protocol specification, Release 13.

SUMMARY

Methods and apparatus, including computer program products, are provided for resuming connections.

In some example embodiments, there may be provided a method that includes receiving, at a user equipment, a radio resource control connection resume message; verifying, at the user equipment, an integrity of the received radio resource control connection resume message, wherein the user equipment verifies the integrity based on a predetermined value of a packet data convergence protocol hyper frame number; and resuming, by the user equipment, use of a suspended radio resource control connection, when the integrity verification of the received radio resource connection resume message is passed successfully.

In some variations, one or more of the features disclosed herein including the following features could optionally be included in any feasible combination. A radio resource control connection resume complete message may be transmitted when resuming use of the suspended connection. The predetermined value may be fixed to enable synchronization between the user equipment and the base station. The predetermined value may include all bits set to a value of 1. The use of the suspended radio resource control connection may be resumed only when the integrity verification of the received radio resource connection resume message is passed successfully. The base station may be different than the base station where the user equipment suspended the radio resource control.

In some example embodiments, there may be provided a method that includes receiving, at a base station, a radio resource control connection resume request message sent by a user equipment; generating, in response to the received radio resource control connection resume request message, a radio resource control connection resume message; performing integrity protection of the radio resource connection resume message, wherein the integrity protection is performed based on a predetermined value of a packet data convergence protocol hyper frame number; and transmitting to the user equipment the radio resource control connection resume message, wherein the radio resource control connection resume message is integrity protected.

In some variations, one or more of the features disclosed herein including the following features could optionally be included in any feasible combination. The radio resource control connection resume request message may be received to enable resumption of a suspended radio resource control connection. The predetermined value may be fixed to enable synchronization between the user equipment and the base station. The predetermined value may include all bits set to a value of 1. The base station may be different than the base station where the user equipment suspended the radio resource control.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

The RRC connection may, as noted, be suspended by a user equipment and a network and resumed quickly by re-instating the RRC connection using prior, stored context information. When the RRC connection is suspended, this may also trigger the suspension of user plane traffic transfer, such as the PDCP (packet data convergence protocol) protocol data unit (PDU) transfer. The PDCP may provide one or more services to the RRC. These services may include control plane data transfer (via the uplink and/or downlink, for example), ciphering, and/or integrity protection. The PDCP may be implemented in accordance with a standard, such as TS 36.323. See, e.g., 3GPP TS 36.323 V13.2.0 (2016-06), 3rd Generation Partnership Project; Technical Specification Group Radio Access Network; Evolved Universal Terrestrial Radio Access (E-UTRA); Packet Data Convergence Protocol (PDCP) specification (Release 13).

However, there may be certain problems with the RRC connection resume when a user equipment moves to another base station ("new base station") different from the old base station where the RRC connection was suspended. During the resume, the user equipment and the old base station may have stored context information but the new base station may not have certain portions of the context information to properly resume the RRC connection. Specifically, the new base station may not have the correct last PDCP COUNT (e.g., the count or sequence number of the last PDCP packet data unit (PDU)). When this is the case, the UE may not be able to resume the connection since a lack of synchronization in PDCP COUNT between the UE and new base station may result in a failure of the integrity verification. This failure triggers leaving (as shown in Table 1 below which is reproduced from TS 36.331) the suspended RRC connection and the establishment of a new RRC connection.

TS 36.323 describes an example implementation of the PDCP COUNT comprising the PDCP sequence number (PDCP SN) and a hyper frame number (HFN), although other implementations of the PDCP COUNT may be used as well. To limit signaling overhead, individual messages/packets (which may be sent between the UE and base station) may include a short sequence number (PDCP SN), rather than the longer 32-bit PDCP COUNT (in which case the HFN would be synchronized between the base station and UE).

Regarding the PDCP COUNT, it may be implemented in accordance with TS.36.323. When this is the case, for each radio bearer, an independent counter, such as PDCP COUNT (which may be specified by TS 36.323) may be maintained for each of the uplink and the downlink. For each data radio bearer (DRB), the PDCP COUNT may be used as input for the ciphering, while for each signaling radio bearer (SRB), the PDCP COUNT may be used for both ciphering and integrity protection. At connection resume, the PDCP COUNT may be reset for PDUs exchanged after a RRC connection resume.

Given that the PDCP COUNT can wrap or rollover, the same PDCP COUNT value may not, however, be used more than once for a given security key. For example, the base station may be responsible for avoiding re-use of the same PDCP COUNT value with the same radio bearer identity and the same key, KeNB. To avoid the re-use, the base station may trigger an intra cell handover or perform another action that renegotiates the key.

TABLE 1

Reception of the RRCConnectionResume by the UE

The UE shall:
<...>
1> restore the PDCP state and re-establish PDCP entities for all SRBs and DRBs;
<...>
1> request lower layers to verify the integrity protection of the RRCConnectionResume message, using the previously configured algorithm and the $K_{RRCint}$ key;
1> if the integrity protection check of the RRCConnectionResume message fails:
2> perform the actions upon leaving RRC_CONNECTED as specified in 5.3.12, with release cause 'other', upon which the procedure ends;

In some example embodiments, PDCP COUNT synchronization may be provided between the UE and the base station during a RRC connection suspension and resumption, regardless of whether the RRC connection is resumed at the same, old base station where the RRC connection was suspended or another, new base station different from the so-called old base station. In some example embodiments, the PDCP COUNT synchronization is performed using a predetermined value.

In some example embodiments, at least part of the PDCP COUNT value used in integrity protection and verification of the RRCConnectionResume message may be specified as a fixed, predetermined value.

In some example embodiments, the HFN part of the PDCP COUNT may be configured to a fixed, predetermined value. This fixed value may have all bits set to "1". After a PDCP reestablishment is invoked (which may be triggered by the RRCConnectionResume), the UE's PDCP will expect the next PDU received on an SRB to have a PDCP COUNT equal to zero, which is the next value in the PDCP COUNT after the PDCP COUNT value of 232-1. Having the fixed HFN part of the PDCP COUNT value predetermined to have all bits set to "1" may maximize the time until that fixed HFN part of the PDCP COUNT value would need to be used again with the same key (as well as other connection parameters) on the SRB. Repeated use of a previous COUNT value should be avoided in order to reduce the need to trigger a connection reestablishment as noted above. Although the same PDCP COUNT value with the fixed HFN part may have been previously used on the SRB at the base station (under which the UE's RRC connection was suspended), that prior use of the PDCP COUNT does not require a reset of the RRC connection due to integrity protection because the RRCConnectionResume message is already processed using a new security key. In some implementations, the PDCP SN may also be fixed (e.g., to have all bits set to "0" or all bits set to "1").

Figure 1:
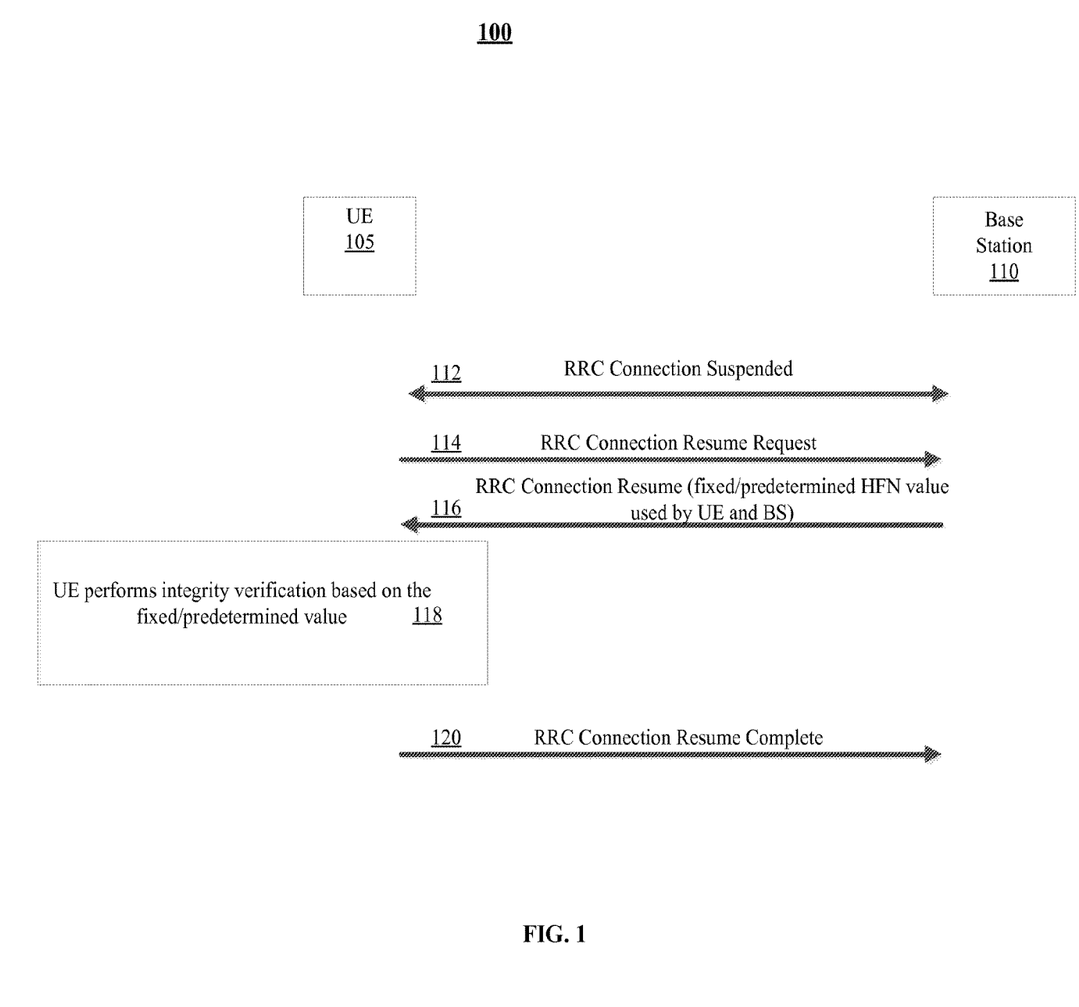
FIG. 1 depicts an example of a process for suspending and resuming a connection, in accordance with some example embodiments.

FIG. 1 depicts an example of a process 100 for handling PDCP COUNT, in accordance with some example embodiments. The process depicts a user equipment 105 and a base station 110, such as an evolved node B type base station (eNB) although other types of base stations and wireless access points may be used as well.

At 112, the RRC connection may be suspended, in accordance with some example embodiments. When this is the case, user plane traffic transmission via the uplink and/or the downlink may also be suspended. Moreover, the UE 105 and the base station 110 (or other network node) may store the context associated with the suspended RRC connection between the UE 105 and base station 110. The stored context may also include information related to the PDCP connection as well.

At 114, UE 105 may send a message to request for the resumption of the suspended connection, in accordance with some example embodiments. For example, UE 105 may send an RRC connection resume request message to the base station 110.

Although 114 is requesting the connection resume to the same base station 110 at which the RRC connection was suspended, the connection resume request sent at 114 may be sent to other base stations, such as a new base station.

At 116, the base station 110 may send a connection resume message, in accordance with some example embodiments. For example, base station 110 may send, in response to message 114, an RRC connection resume message to the UE 105. In some example embodiments, the RRC connection resume message may be integrity-protected using a predetermined PDCP hyper frame number (HFN). This PDCP HEN maps to a PDCP COUNT value (e.g., 232-1 as noted above). This predetermined PDCP HFN allows the UE 105 and base station 110 to be in synchronization, even when the UE 105 moves to another, new base station after the initial suspension and RRC connection context retention. In the case of a new base station, the new base station may obtain, via signaling to the old base station or another network node, some of the context information but not the PDCP HFN or COUNT, so the use of the predetermined value provides little if any disruption to this signaling.

At 118, the UE 105 may verify, based on the predetermined PDCP HFN, the integrity of the received RRC connection resume message, in accordance with some example embodiments. If the verification is confirmed, then the UE may resume use of the RRC connection that was previously suspended. If the verification is not confirmed (e.g., the UE's expected PDCP COUNT and the PDCP COUNT used to integrity-protect the message 116 do not match), then the UE leaves the RRC connection and thus the previously suspended RRC connection is not re-used by the UE (in which case the UE may request an new RRC connection).

At 120, the UE may send, in accordance with some example embodiments, to the base station 110 an RRC connection resume complete message to indicate that the UE resumes use of the RRC connection that was previously suspended.

Figure 2A:
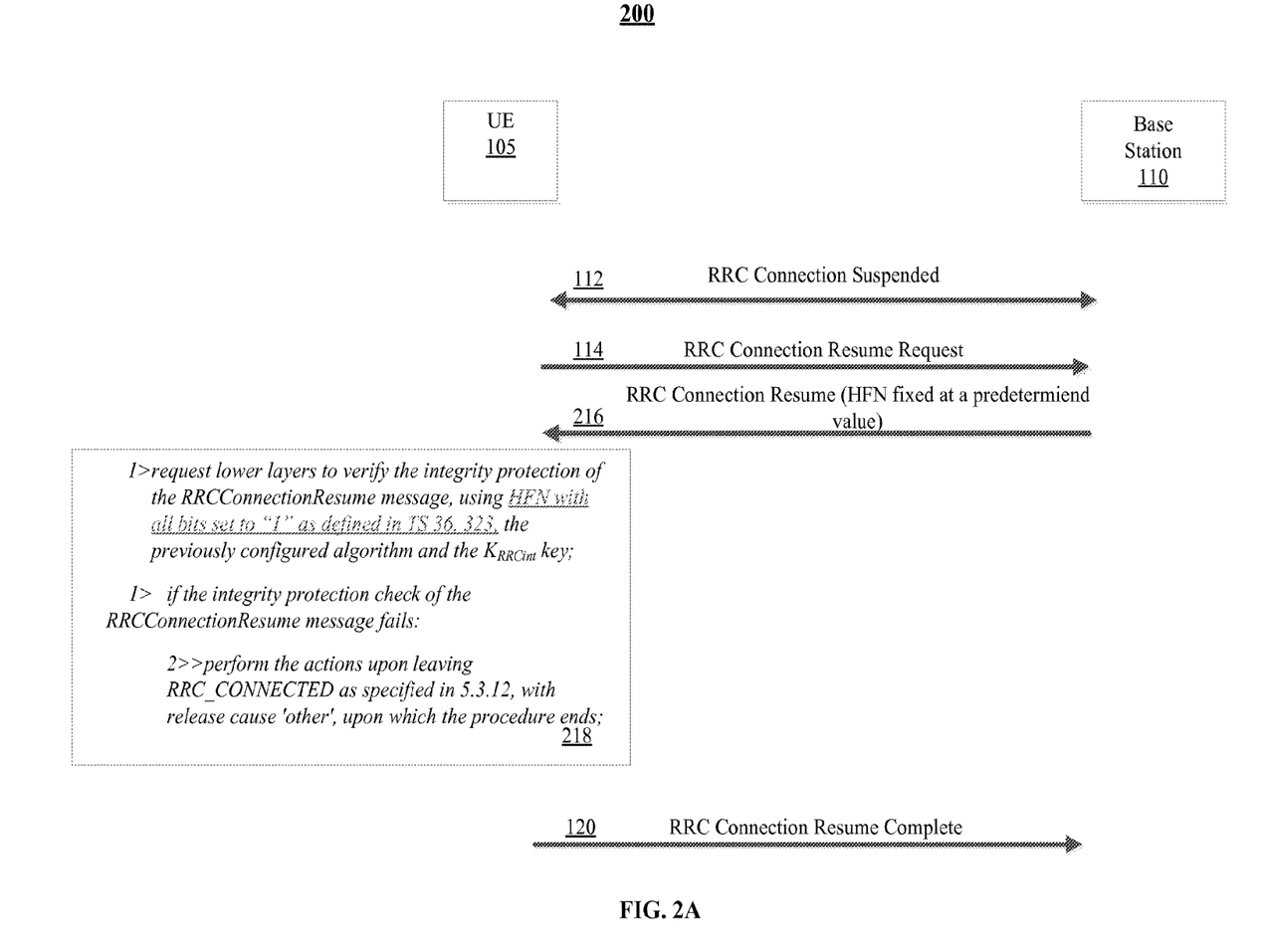
FIG. 2A depicts another example of a process for suspending and resuming a connection, in accordance with some example embodiments.

FIG. 2A depicts an example of a process 200 for handling PDCP COUNT, in accordance with some example embodiments. Process 200 is similar to process 100 in some respects, but in the case of process 200, the predetermined PDCP HFN is configured with all bits set to "1". At 218, the UE 105 may request the lower layers to verify the integrity protection of the RRCConnectionResume message received at 216. For example, if the HE (or its lower layers) successfully verifies the integrity of the RRCConnectionResume message assuming the predetermined HFN, then the UE may enter, or resume, the RRC connected mode using the context for that connection. If the verification fails, then the UE does not resume the RRC connection and thus leaves the RRC connection. Table 2 below depicts an example RRC-specification text for 218.

TABLE 2

Reception of the RRCConnectionResume by the UE

The UE shall;
<...>
    1>reguest lower layers to verify the integrity protection of the
       RRCConnectionResume message, using HFN with all bits set to TABLE 2-continued Reception of the RRCConnectionResume by the UE        "1" as defined in TS 36. 323, the previously configured
       algorithm and the $K_{RRCint}$ key;
    1> if the integrity protection check of the RRCConnectionResume
message fails:
       2>>perform the actions upon leaving RRC_CONNECED as
specified in 5.3.12, with release cause 'other' upon which the
procedure ends;

At 120, the UE may send, in accordance with some example embodiments, to the base station 110 an RRC connection resume complete message to indicate that the UE resumes use of the RRC connection that was previously suspended.

Figure 2B:
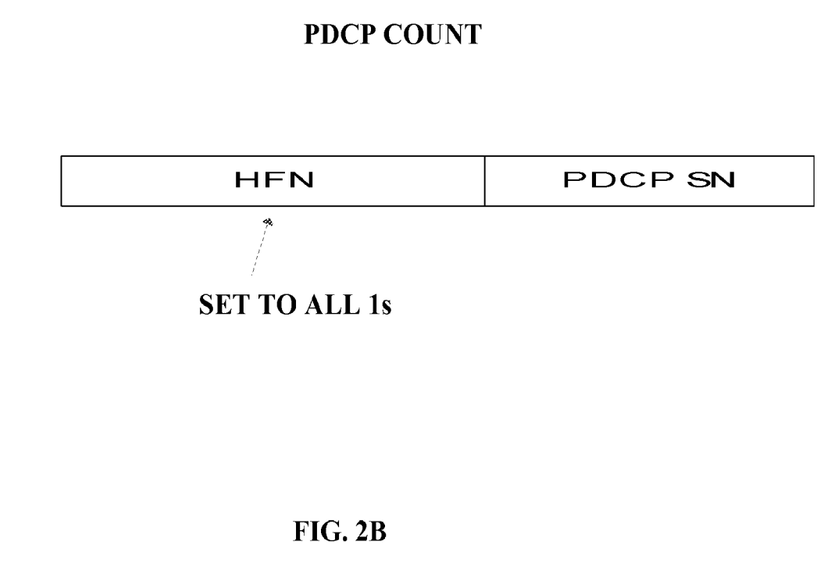
FIG. 2B depicts an example of a PDCP COUNT, in accordance with some example embodiments.

FIG. 2B depicts an example of a PDCP COUNT, in accordance with some example embodiments. In the example shown, the HFN may have all of its bits set to one. When a predetermined HFN value is used by both the UE and the base station, there will be no ambiguity on the used HFN and the PDCP COUNT between the UE and base station will be in synchronization (provided that also the PDCP SN is in synchronization) so the integrity verification performed on the message will pass. Synchronization of the PDCP SN can be achieved in different ways. As an example, the PDCP SN included in the header of the PDCP PDU containing the RRC connection resume message can be used. As another example, a predetermined value can be used also for the PDCP SN.

Figure 3:
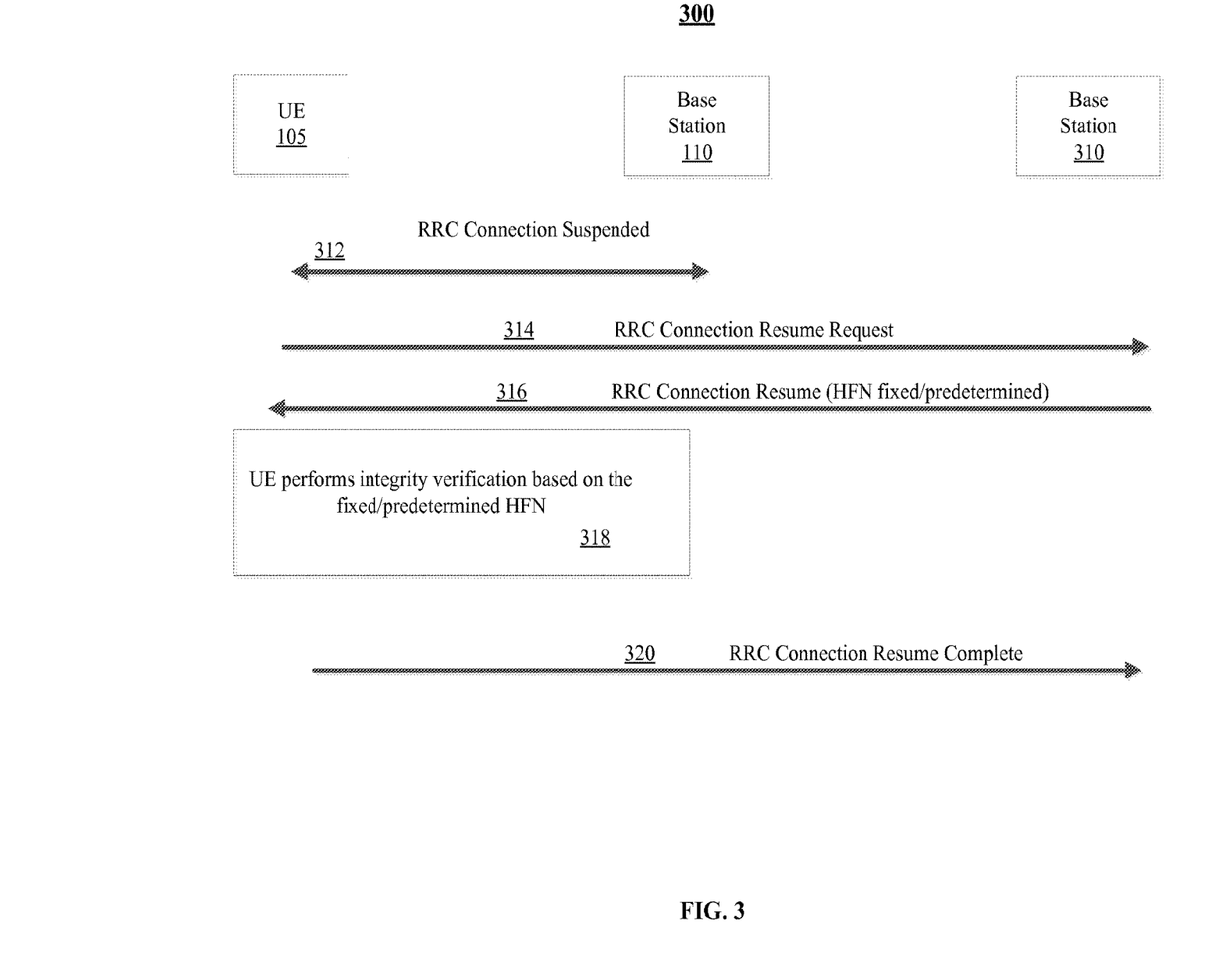
FIG. 3 depicts yet another example of a process for suspending and resuming a connection, in accordance with some example embodiments.

FIG. 3 depicts an example of a process 300 for handling PDCP count, in accordance with some example embodiments. FIG. 3 shows two base stations 110 and 310. The first base station 110 is where the RRC connection is suspended, while the second base station is where the RRC connection is resumed.

At 312, the RRC connection may be suspended between UE 105 and base station 110, in accordance with some example embodiments. Moreover, user plane traffic transmission via the uplink and/or the downlink may also be suspended. Moreover, the UE 105 and the base station 110 may store the context associated with the suspended RRC connection and/or PDCP context as well. At 314, UE 105 may send a RRC connection resume request message to another base station 310, in accordance with some example embodiments. At 316, the new base station 310 may send a connection resume message, in accordance with some example embodiments. The RRC connection resume message may be integrity-protected using a PDCP HFN that has a predetermined value, such as all bits set to "1". In some example embodiments, the new base station 310 may obtain some of the context information regarding the suspended connection (e.g., from base station 110 or another node) but not the PDCP COUNT or SN. At 318, the UE 105 may verify the integrity of the received RRC connection resume message, in accordance with some example embodiments. This verification may be performed as described above at 118 and/or 218. At 320, the UE may send, in accordance with some example embodiments, to the base station 310 an RRC connection resume complete message to indicate that the UE resumes use of the RRC connection that was previously suspended.

Figure 4:
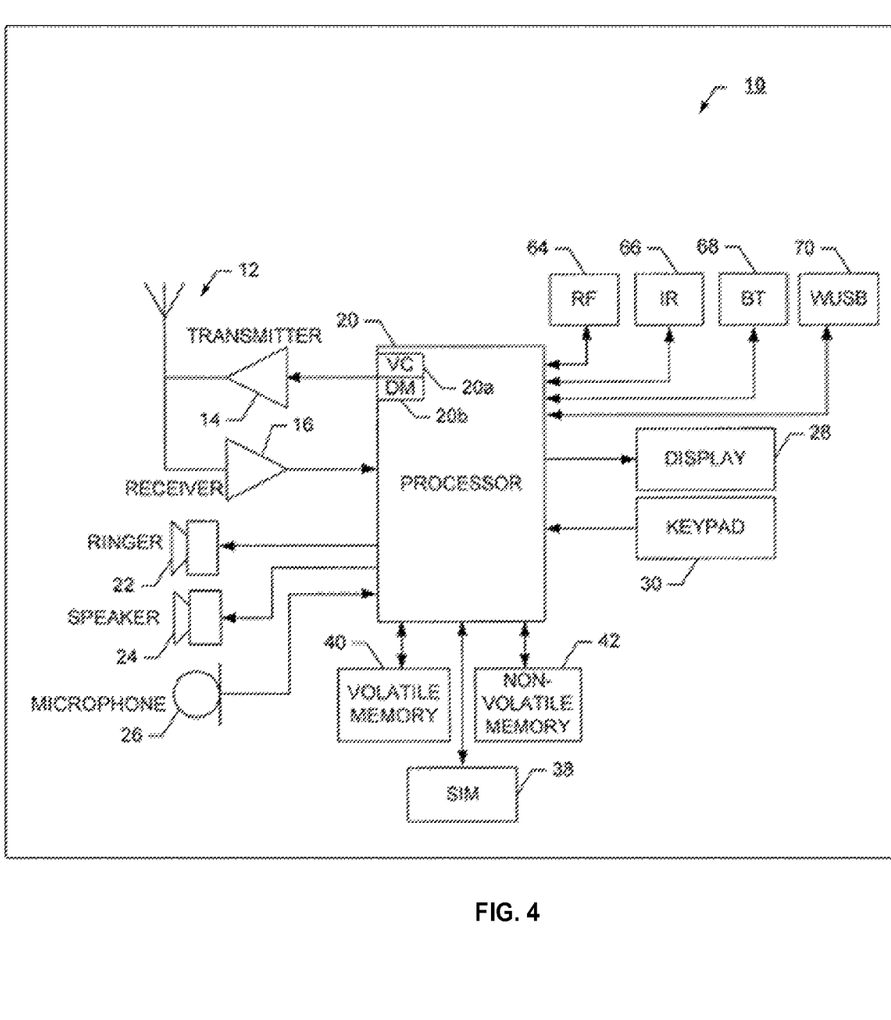
FIG. 4 depicts an example of an apparatus, in accordance with some example embodiments.

In the example of process 300, the base station may receive a radio resource control connection resume request message sent by a user equipment. The base station may generate, in response to the received radio resource control connection resume request message, a radio resource control connection resume message. The base station may perform integrity protection of the radio resource connection resume message. The integrity protection may be performed based on a predetermined value of a packet data convergence protocol hyper frame number. The base station may also transmit to the user equipment the radio resource control connection resume message, wherein the radio resource control connection resume message is integrity protected. FIG. 4 illustrates a block diagram of an apparatus 10, in accordance with some example embodiments. The apparatus 10 (or portions thereof) may be configured to provide a radio, such as user equipment 105 and/or a base station 110 and/or 310. The apparatus may be implemented as any device including a wireless device, a smart phone, a cell phone, a machine type communication device, a wireless sensor, a radio relay, an access point, and/or any other radio including a processor and memory based device.

In some example embodiments, apparatus 10 may be configured to support handling of a fixed or predetermined PDCP HFN as described herein.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to a user equipment and/or a base station (see, e.g., processes 100, 200, and/or 300). The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment and/or a base station (see, for example, process 100, 200, and/or 300).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is enhanced use of radio resources including RRC connection suspension and resume.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

The invention claimed is:

1. A method comprising:
receiving, at a user equipment, a radio resource control connection resume message;
verifying, at the user equipment, an integrity of the received radio resource control connection resume message, wherein the user equipment verifies the integrity based on a predetermined value of a packet data convergence protocol hyper frame number, wherein the packet data convergence protocol hyper frame number comprises a plurality of bits each set to a predetermined identical value; and
in an instance in which the user equipment successfully verifies the integrity of the received radio resource control connection resume message, resuming, by the user equipment, use of a suspended radio resource control connection.

2. The method of claim 1, further comprising:
transmitting a radio resource control connection resume complete message in an instance in which use of the suspended radio resource control connection is resumed.

3. The method of claim 1, wherein the predetermined value is fixed to enable synchronization between the user equipment and a base station.

4. The method of claim 3, wherein the base station with which the user equipment resume use of the suspended radio resource control connection is different than another base station with which the user equipment suspended the radio resource control connection.

5. The method of claim 1, further comprising:
transmitting, at the user equipment, a message to request for resumption of the suspended radio resource control connection.

6. A user equipment comprising:
at least one processor; and
at least one memory including computer program code, wherein the at least one memory and the computer program code are configured to, with the at least one processor, cause the user equipment to at least:
receive a radio resource control connection resume message;
verify an integrity of the received radio resource control connection resume message, wherein the user equipment verifies the integrity based on a predetermined value of a packet data convergence protocol hyper frame number, wherein the packet data convergence protocol hyper frame number comprises a plurality of bits each set to a predetermined identical value; and
in an instance in which the integrity of the received radio resource control connection resume message is successfully verified, resume use of a suspended radio resource control connection.

7. The user equipment of claim 6, wherein the at least one memory and the computer program code are further configured to, with the at least one processor, cause the user equipment to at least:
in an instance in which use of the suspended radio resource control connection is resumed, transmit a radio resource control connection resume complete message.

8. The user equipment of claim 6, wherein the predetermined value is fixed to enable synchronization between the user equipment and a base station.

9. The user equipment of claim 8, wherein the base station with which the user equipment resumes use of the suspended radio resource control connection is different than another base station with which the user equipment suspended the radio resource control connection.

10. The user equipment of claim 6, wherein the at least one memory and the computer program code are configured to, with the at least one processor, further cause the user equipment to at least:
transmit a message to request for resumption of the suspended radio resource control connection.

11. A non-transitory computer-readable storage medium including program code which, when executed by a user equipment, causes the user equipment to carry out at least, causes operations comprising:
receiving, at a user equipment, a radio resource control connection resume message;
verifying, at the user equipment, an integrity of the received radio resource control connection resume message, wherein the user equipment verifies the integrity based on a predetermined value of a packet data convergence protocol hyper frame number, wherein the packet data convergence protocol hyper frame number comprises a plurality of bits each set to a predetermined identical value; and
in an instance in which the integrity of the received radio resource control connection resume message is verified successfully, resuming, by the user equipment, use of a suspended radio resource control connection.

12. The storage medium of claim 11, further including program code which, when executed by the user equipment, causes the user equipment to carry out at least:
in an instance in which use of the suspended radio resource control connection is resumed, transmitting a radio resource control connection resume complete message.

13. The storage medium of claim 11, wherein the predetermined value is fixed to enable synchronization between the user equipment and a base station.

14. The storage medium of claim 13, wherein the base station with which the user equipment resumes use of the suspended radio resource control connection is different than another base station with which the user equipment suspended the radio resource control connection.

15. The storage medium of claim 11, wherein the storage medium is embodied by the user equipment.

16. The storage medium of claim 11, further including program code which, when executed by the user equipment, causes the user equipment to carry out at least:
transmitting, at the user equipment, a message to request for resumption of the suspended radio resource control connection.

* * * * *

UNITED STATES PATENT AND TRADEMARK OFFICE
CERTIFICATE OF CORRECTION

PATENT NO. : 11,849,323 B2
APPLICATION NO. : 17/532471
DATED : December 19, 2023
INVENTOR(S) : Henri Koskinen It is certified that error appears in the above-identified patent and that said Letters Patent is hereby corrected as shown below:

In the Claims

In Column 12, Lines 27-28, Claim 11, delete "least, causes operations comprising:" and insert -- least: --, therefor.

Signed and Sealed this
Twelfth Day of March, 2024

Katherine Kelly Vidal
Director of the United States Patent and Trademark Office